(12) United States Patent
Stringham (10) Patent No.: US 7,734,887 B1
(45) Date of Patent: Jun. 8, 2010

(54) RELOCATION TRACKING DURING WRITE OPERATION

(75) Inventor: Russell R. Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 417 days.

(21) Appl. No.: 11/755,396

(22) Filed: May 30, 2007

(51) Int. Cl.
 *G06F 7/26* (2006.01)
(52) U.S. Cl. ...................................... 711/165; 711/162
(58) Field of Classification Search .................. 711/165, 711/162
 See application file for complete search history.

(56) References Cited

U.S. PATENT DOCUMENTS 6,571,261 B1 * 5/2003 Wang-Knop et al. ........ 707/206
2004/0133602 A1 * 7/2004 Kusters et al. ........... 707/104.1
2005/0231765 A1 * 10/2005 So et al. ..................... 358/1.16
2006/0005206 A1 * 1/2006 Schneider ................... 719/319
2007/0168633 A1 * 7/2007 English et al. .............. 711/165

* cited by examiner

*Primary Examiner*—Matt Kim
*Assistant Examiner*—Hal Schnee
(74) *Attorney, Agent, or Firm*—Advantedge Law Group (57) ABSTRACT

Tracking of memory block relocation when write occur to memory blocks. After detecting a write operation to be performed on a particular target memory block, it is identified whether the write operation is due to a relocation of data from another memory block. Depending at least in part on this result, the modified data may not need to be included in a subsequent incremental backup. If appropriate, relocation data is included instead. This may potentially reduce the size of the incremental backup, especially in cases in which there were many memory block movements since the last backup, as is the case with defragmentation.

18 Claims, 9 Drawing Sheets

① → Not A Relocation Write Type

② → Is A Relocation, But Source Relocation Status Clear
       Source Modified Status Set ③ → Is A Relocation, But Source Relocation Status Clear
       Source Modified Status Clear ④ → Is A Relocation, But Source Relocation Status Set

RELOCATION TRACKING DURING WRITE OPERATION

BACKGROUND OF THE INVENTION

Computing technology has transformed the way we work and play. Business, residences, and other enterprises have come to rely on computing systems to manage their key operational data. Often, the data itself is many times more valuable to an enterprise than the computing hardware that stores the data. Accordingly, in this information age, many enterprises have taken precautions to protect their data.

One way of protecting data is to introduce storage redundancy. For example, a primary computing system maintains and operates upon the active data. Meanwhile, a backup computing system maintains a copy of the data as the active data existed at a previous instant in time. The backup copy of the data is periodically updated. More frequent updates tend to increase the freshness of the data at the backup computing system.

In order provide such a backup copy to the backup computing system, resources associated with the channel between the primary and backup computing systems are used. For example, when the primary and backup computing systems are located across a network, network bandwidth and other resources are consumed. Even if the primary and backup computing systems are located on the same machine, disk access time and processing resources are expended.

In order to reduce the channel resources expended in order to transfer the backup copy, incremental backup technology is employed. Initially, a full backup is performed such that the backed up memory blocks on the backup computing system have the same content as the corresponding primary memory blocks on the primary computing system. Moving forward from the time of the last backup, the primary computing system may continue to operate on the primary data. As this happens, the content of certain memory blocks (e.g., disk sectors or clusters) on the primary computing system may change due to writes to such memory blocks. During a subsequent incremental backup operation, only the content for the associated primary memory blocks that have changed since the time of the last backup operation are transferred to the backup computing system.

The use of incremental backup technology can significantly reduce the channel resources used to perform the backup in many situations. After all, an incremental backup captures only the changed memory blocks that are still in use by the file system. However, if a disk defragmenter runs after the full backup is taken, then a large number of memory blocks change as the data is rearranged. In the worst case, where most sectors are rearranged, the subsequent incremental backup can approach the same size as the initial full backup, even though none of the internal file data has changed.

BRIEF SUMMARY OF THE INVENTION

The foregoing problems with the prior state of the art are overcome by the principles of the present invention, some embodiments of which are directed towards the tracking of memory block relocation when writes occur to memory blocks. After detecting a write operation to be performed on a particular target memory block, the write is performed on the target memory block. However, before and/or after this write operation is implemented, it is identified whether the write operation is due to a relocation of data from another memory block. Depending at least in part on this result, the modified data may not need to be included in a subsequent incremental backup. If appropriate, relocation data is included instead (such as for example, a pointer to where the original data might be found in the base backup). This may potentially reduce the size of the incremental backup, especially in cases in which there were many memory block movements (as is the case with defragmentation) since the last backup.

Additional embodiments the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Embodiments described herein include mechanisms for tracking of memory block relocation when writes occur to memory blocks. After detecting a write operation to be performed on a particular target memory block, it is determined whether the write operation is due to a relocation of data from another memory block. Depending at least in part on this result, the modified data may not need to be included in a subsequent incremental backup. If appropriate, relocation data is included instead. This may potentially reduce the size of the incremental backup, especially in cases in which there were many memory block movements since the last backup, as is the case with defragmentation.

First, a general computing system will be described with respect to FIG. 1, as being a suitable computing system that may be used to practice the principles of the present invention. Then, the primary and backup environment in which the invention may be practiced will be described with respect to FIG. 2. Finally, the specific embodiments will be described with respect to FIGS. 3 through 9.

Figure 1:
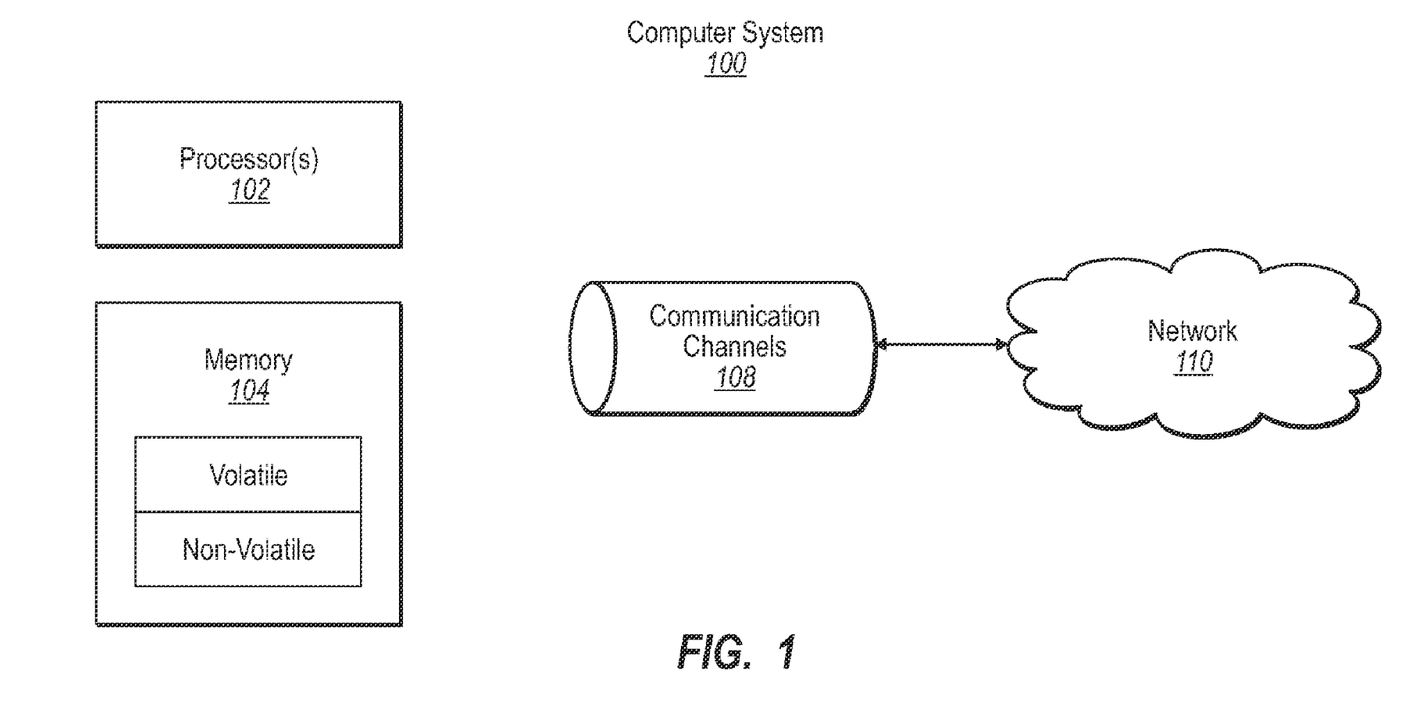
FIG. 1 illustrates a computing environment in which embodiments of the present invention may be employed.

FIG. 1 shows a schematic diagram of an example computing system that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory is Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) flash memory cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware or hardware are also possible and contemplated. Thus, the terms "module" or "component" may apply to hardware or combinations of hardware and software that are implemented on a computing system.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
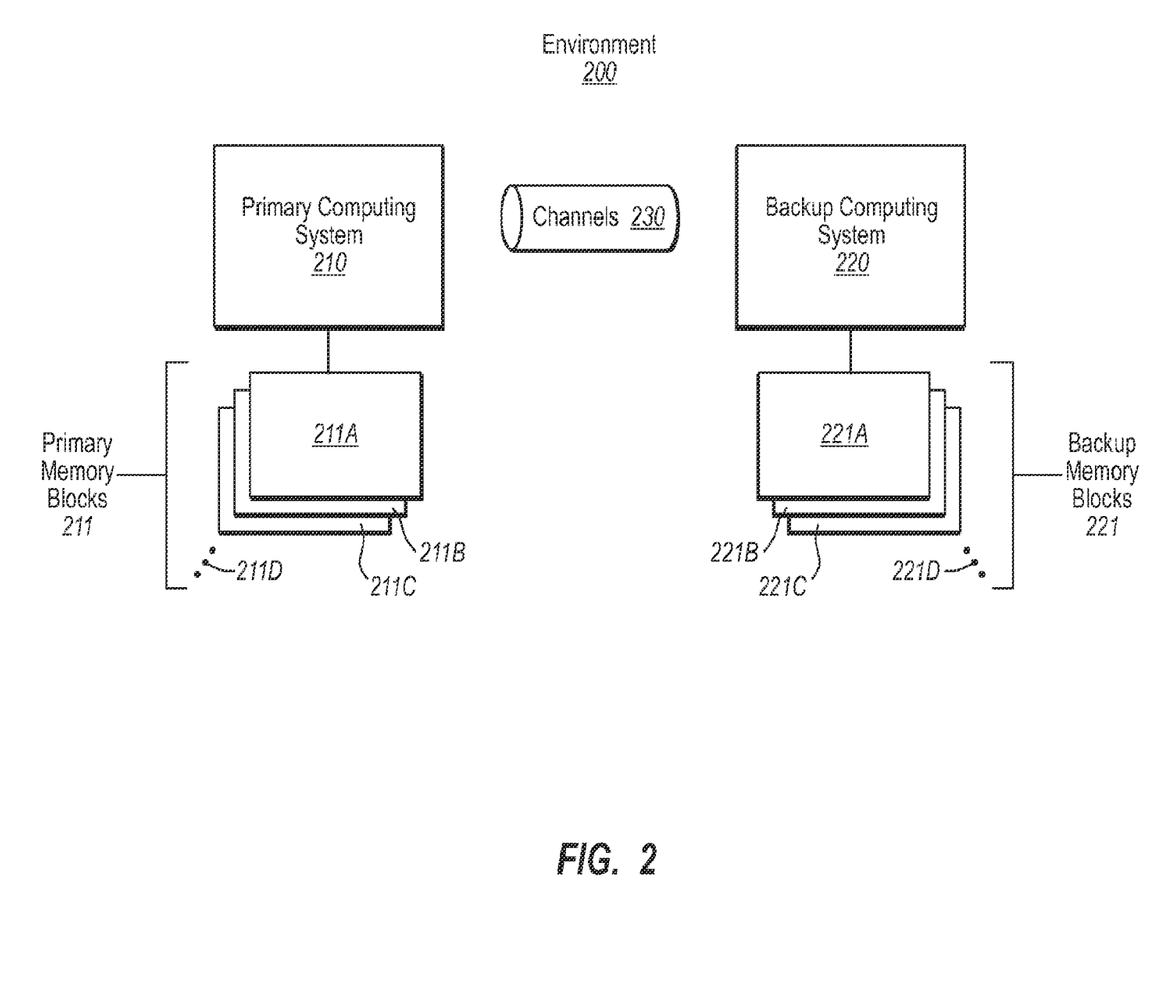
FIG. 2 illustrates a backup environment in which a primary computing system may communicate with a backup computing system for purposes of backing up active data.

FIG. 2 illustrates a network environment 200 that includes a primary computing system 210 and a backup computing system 220. The primary computing system 210 is termed "primary" because it maintains the active data that is to be protected. The backup computing system 220 is termed "backup" because it maintains a backup copy of the active data as the active data existed at a previous point in time. The primary computing system 210 and the backup computing system 220 may each be structured as described above for the computing system 100 of FIG. 1. However, this is not required by any means. The primary computing system 210 and the backup computing system 220 may be any computing system of any form, and may even be parts of a single system.

The primary computing system 210 and the backup computing system 220 each have access to multiple memory blocks. As used herein the term, "memory block" refers to any portion of memory, whether volatile memory, non-volatile memory or storage. For instance, in the case of magnetic or optical disk storage, memory blocks may be measured in terms of "sectors". A sector is an addressable portion of disk space that is often 512 bytes in size for magnetic disk drives. When referring to magnetic disk drives, a "cluster" is typically 1024 bytes or 4096 bytes as directed by the operating system.

When working with disk storage, it is often convenient to work with entire sectors or clusters of storage at a time. However, even when operating on disk storage, the principles of the present invention may also operate with primary or backup "memory blocks" that are not sized as integer multiples of sectors and/or clusters. Furthermore, although there are efficiencies in working with multiple memory blocks of the same size, the principles of the present invention are not limited to working with memory blocks that are of the same size. The memory blocks may be, for example, files, which often have variable sizes as permitted by the file system.

The primary computing system 210 is illustrated as having access to a number of memory blocks 211A, 211B, 211C amongst potentially many others as represented by the ellipses 211D. Such primary memory blocks may be referred to collectively herein as "primary memory blocks 211". The backup computing system 220 is illustrated as having access to a number of memory blocks 221A, 221B, 221C amongst potentially many others as represented by the ellipses 221D. Such backup memory blocks may be referred to collectively herein as "backup memory blocks 221".

As the primary computing system 210 normally operates, the "data" within any given primary memory block may change over time. At certain times referred to herein as "backup times", the primary computing system 210 provides an image or "picture" of at least some of the primary memory blocks as those blocks existed at the corresponding backup time, and then provides the memory blocks to the backup computing system 220. The primary computing system 210 may communicate with the backup computing system 220 over channel 230. The channel 230 may be, for example, a network, but may also be a bus or other channel internal to a single computing system.

Figure 3:
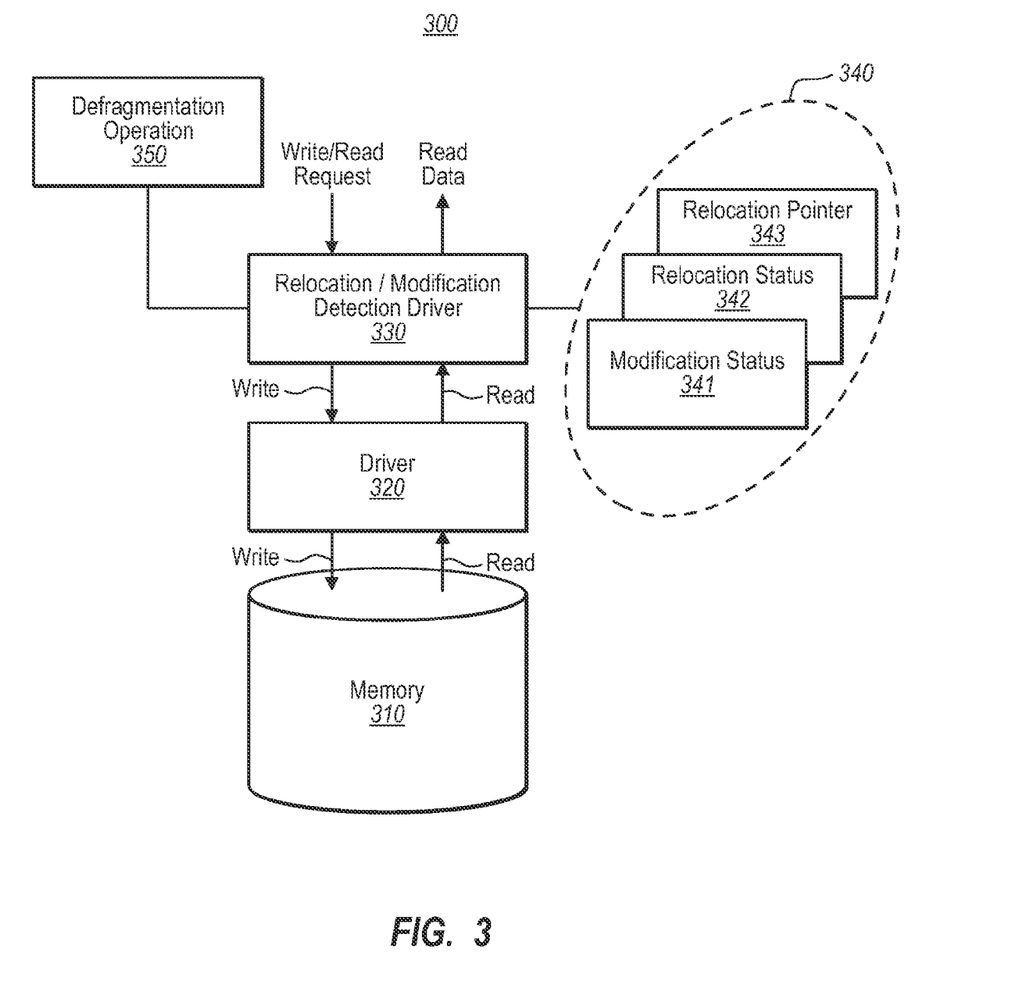
FIG. 3 illustrates a relocation/modification detection driver operating to intercept memory block write requests.

FIG. 3 illustrates communication channel 300 used to write and read data from memory 310. For instance, if the communication channel 300 is implemented in the primary computing system 210 of FIG. 2, the primary memory blocks 211 may be stored within the memory 310 of FIG. 3. If the communication channel 300 is implemented in the backup computing system 220 of FIG. 2, the backup memory blocks 221 may be stored within the memory 310 of FIG. 3.

The communication channel 300 includes a driver 320 that operates to apply electrical signals to the memory 310 to thereby fulfill memory operation requests that the driver receives. The driver also interprets electrical signals received from the memory 310 to thereby interpret request responses. For instance, if the driver 320 receives a write operation request, the driver 320 writes the data to the designated memory block of the memory 310. If the driver 320 receives a read operation request, the driver 320 requests that data from the memory 310, and reads the data from the requested data block. If, for example, the memory 310 were a hard disk, the driver 320 might be, for example, a disk driver.

A relocation/modification detection driver 330 is illustrated above the driver 320 to emphasize that the relocation/modification detection driver 330 is positioned to intercept write requests issued to the driver 320. The relocation/modification detection driver 330 may be separate from the driver 320, but may also be full or partially incorporated within the driver 320.

Figure 4A:
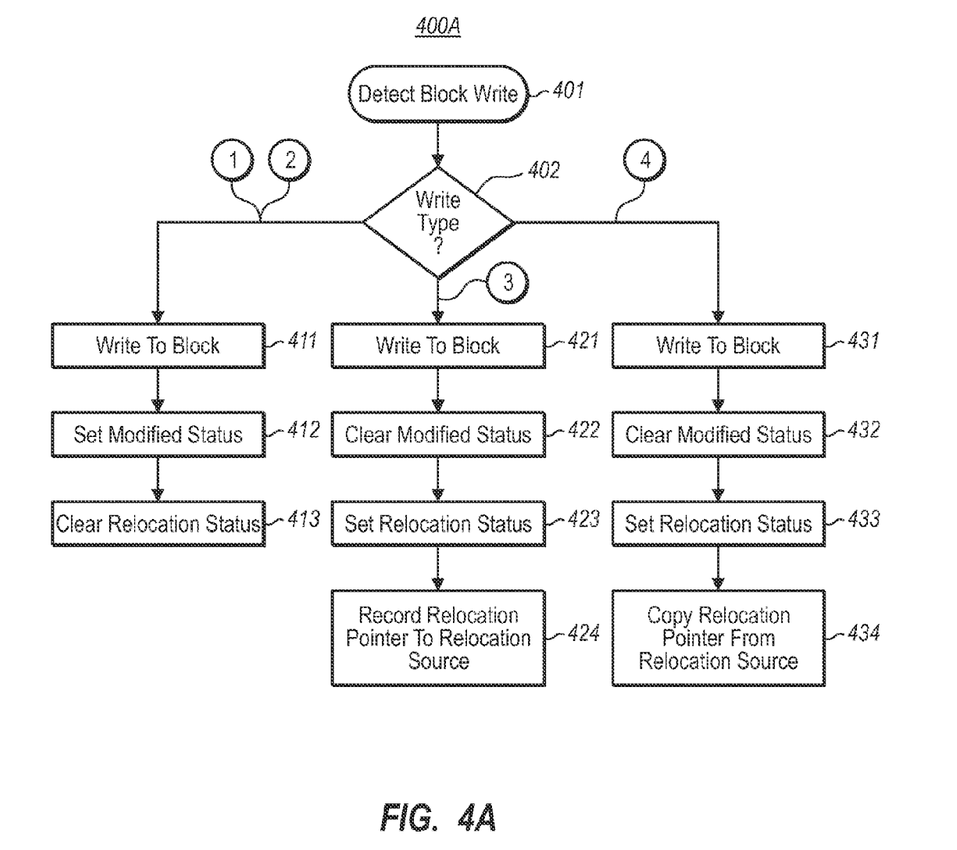
FIG. 4A illustrates a flowchart of a method for tracking modification and relocation in accordance with one embodiment of the present invention.

The relocation/modification driver 330 has access to relocation/modification data 340 including modification status information 341, relocation status information 342, and relocation pointer information 343. An example operation of the relocation/modification detection driver 330 with respect to the relocation/modification data 340 will be described with respect to FIG. 4.

FIG. 4A illustrates a flowchart of a method 400A for a computer system to track memory block relocation in accordance with one embodiment of the present invention. For instance, the method 400A might be performed by the relocation/modification detection driver 330. The method 400A is initiated when a memory block write operation is detected (act 401), and may be performed for multiple or even all block write operations. The memory block write operation is a request to write to a target memory block of the computing system.

Figure 5:
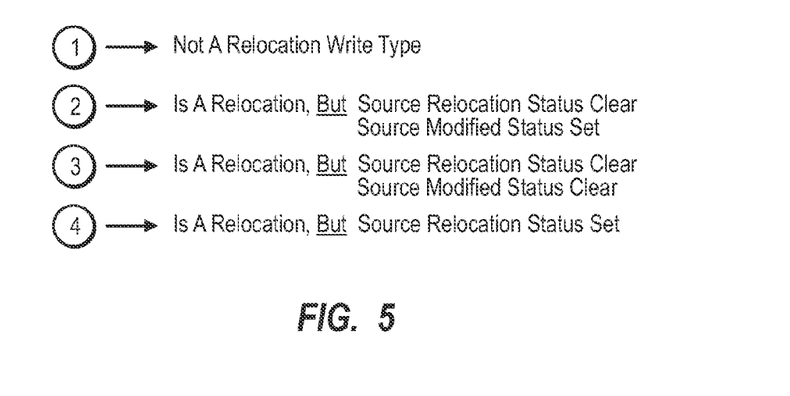
FIG. 5 illustrates four write types evaluated using the method of FIG. 4.

The flow of processing then branches depending on the type of write operation (decision block 402). There are four different categories of write operation types labeled 1 through 4. The legend for each write type is illustrated in FIG. 5.

Write type 1 is a write operation that does not represent a relocation of data from a source memory block to the target memory block being written to by the write operation. Data is often relocated from one memory block to another. For instance, during a defragmentation operation, many if not most of the memory blocks in the entire file system may be relocated. Referring back to FIG. 3, if the method 400 is implemented by the relocation/modification detection driver 330, the driver 330 may be coupled to a defragmentation operation 350 or module through, for example, an Application Program Interface (API). This would allow for detection on whether or not the write operation is a relocation operation. Other mechanisms may also be used to identify the write operation as a relocation operation. Thus write type 1 is a write operation that cannot be confirmed to be the result of a relocation operation. That is not to say that the write operation is not a relocation. That is just to say that it is not identified as a relocation operation.

Write type 2 is a write operation that is 1) identified as being due to a relocation of data from a source memory block to a target memory block, 2) has its source relocation status clear, and 3) has its source modification status set. In this description and in the claims, a "source relocation status" and a "source modification status" are features of a source memory block when data from a source memory block is being moved to a target memory block being written to.

"Source relocation status" represents information regarding whether the data from the source memory block had been previously relocated from another source memory block since the time that that data was last backed up. In this description, a source relocation status being "clear" means that the data from the source memory block is not identified by the source relocation status as being also relocated from yet another source memory block since the time of the last backup. In this description, a source relocation status being "set" means that the data from the source memory block is identified by the source relocation status as also being relocated from yet another source memory block. This definition should become clearer from an example that will be described further below with respect to FIG. 6.

"Source modification status" represents information regarding whether the data from the source memory block has been modified while at the source memory block location since the time that that data was last backed up. In this description, a source modification status being "clear" means that the data from the source memory block is not identified by the source modification status as being modified since the time of the last backup. In this description, a source modification status being "set" means that the data from the source memory block is identified by the source modification status as having been modified. This definition should also become clearer from an example that will be described further below with respect to FIG. 6.

Write type 3 is a write operation that is 1) identified as being due to a relocation of data from a source memory block to a target memory block, 2) has its source relocation status clear, and 3) has its source modification status clear. Thus, a write operation of type 3 is a relocation write in which the data from the source memory block is not identified by the source relocation status as being relocated, and is not identified by the source modification status as having been modified.

Write type 4 is a write operation that is 1) identified as being due to a relocation of data from a source memory block to a target memory block, and 2) has its source relocation status set. Thus, a write operation of type 4 is a relocation write in which the data from the source memory block is identified by the source relocation status as having been relocated from yet another source memory block.

The remainder of FIG. 4A will now be described briefly, following which the method 400A of FIG. 4A will be discussed much more rigorously with respect to an example shown in FIG. 6, in which an example of 15 memory blocks are subjected to several phases of state changes using the method 400A of FIG. 4A.

If the write operation is of type 1 or 2, the write operation is implemented on the target memory block (act 411), the modification status of the target memory block is set (i.e., the target memory block is recorded as having been modified) (act 412), and the relocation status is clear (i.e., the target memory block is recorded as not identified as relocated) (act 413). Acts 411 through 413 may be performed as part of the same transaction to avoid backup corruption. Furthermore, the order of acts 411 through 413 are not important. Acts 413 and/or 412 may be performed before act 411. Furthermore, acts 413 may occur before or after act 412.

If the write operation is of type 3, the write operation is implemented on the target memory block (act 421), the modified status of the target memory block is clear (act 422), the relocation status of the target memory block is set (act 423), and a relocation pointer is recorded for the target memory block that points back to the source memory block from which the data was relocated (act 424). Optionally, acts 421 through 424 may be performed as part of the same transaction, such that they are either all performed, or all not performed, should the computing system experience a failure. Again the exact order of acts 421 through 424 is not important.

If the write operation is of type 4, the write operation is implemented on the target memory block (act 431), the modified status of the target memory block is clear (act 432), the relocation status of the target memory block is set (act 433), and a relocation pointer is recorded for the target memory block that points not back to the source memory block from which the data was relocated, but back to the prior source memory block from which the data originated (act 434). Acts 431 through 434 may also optionally be performed as part of the same transaction, and their exact order is not important.

Figure 6:
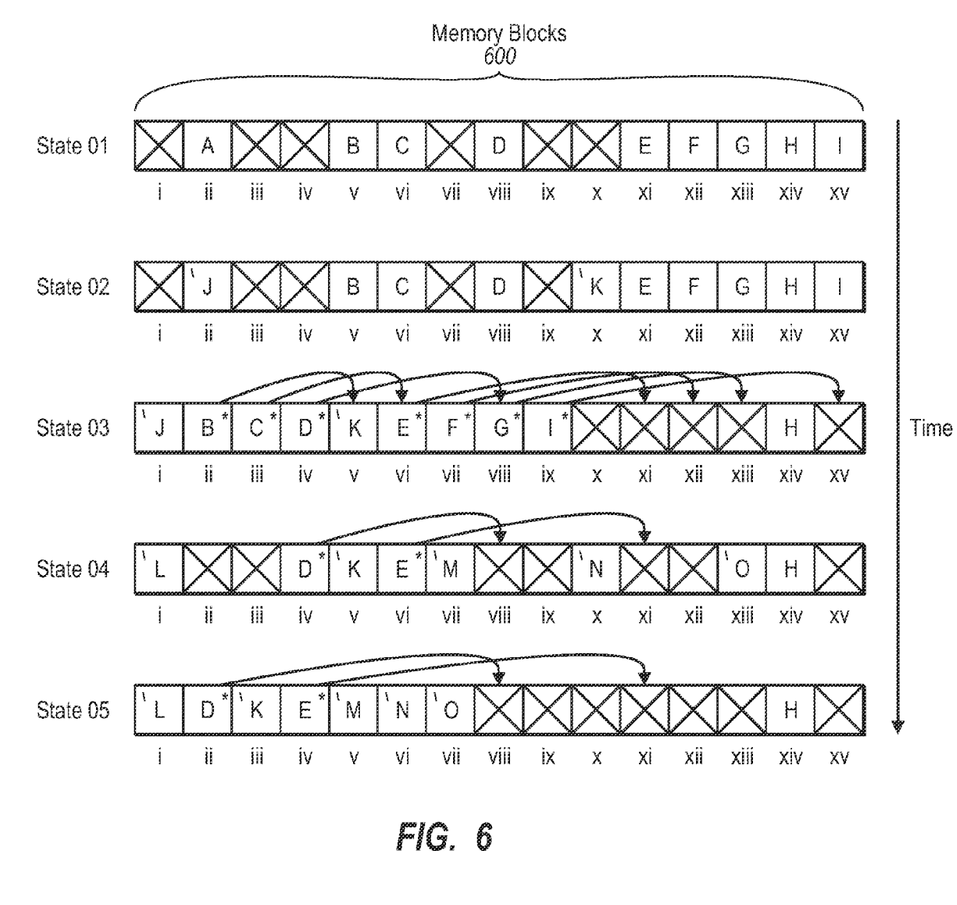
FIG. 6 illustrates an example group of 15 memory blocks that are subject to change over time, used to illustrated an example of relocation and modification tracking.

FIG. 6 illustrates 15 memory blocks 600 in various stages of state transition. Each of the memory blocks are shown contiguously and have locations i through xv labeled from left to right. The content of these various memory locations, of course, may vary over time. Initially, at the time of the last backup, the memory blocks are in state 01. In state 01, 6 of the memory blocks are unused, which is represented in FIG. 6 by the corresponding memory blocks containing an "X". For instance, in state 01, memory blocks i, iii, iv, vii, ix and x are all unused. In state 01, the remaining 9 memory blocks contain a value. The value is represented symbolically using capital letters. For instance, in state 01, memory blocks ii, v, vi, viii, xi, xii, xiii, xiv and xv are illustrated as containing values A through I, respectively.

In transitioning from state 01 to state 02, there are two write operations performed. Specifically, value J is written to memory block ii, and value K is written to memory block x. Thus, the method 400A may be performed twice since two write operations are detected. Both write operations are of type 1. Specifically, the write operations are determined not be the result of a relocation from another source memory block. They are simply new data being written to the target memory block. Thus, in both cases, the modification status is set (act 412), and the relocation status is kept clear (act 413). The modification status is represented symbolically in each memory block of FIG. 6. If the modification status is set, a backslash symbol "\" is placed in the upper left corner of the memory block. If the modification status is not set (is clear), no backslash is placed in the upper left corner of the memory block. For instance, in state 02, memory blocks ii and x have the modifications status set. The relocation status is also represented symbolically in each memory block of FIG. 6. If the relocation status is set, an asterisk "*" is placed in the upper right corner of the memory block. If the relocation status is not set (is clear), no asterisk is placed in the upper right corner of the memory block. In state 02, the relocation status for all memory blocks are clear.

In transitioning from state 02 to state 03 in FIG. 6, a defragmentation occurs. A defragmentation attempts to place data blocks for the same file contiguously and in order for all files in a file system, and attempts to place unused data blocks also contiguously.

In state 03, value J has moved from memory block ii to memory block i. When writing to memory block i, a write operation is detected thereby initiating the method 400A of FIG. 4A. In this case, the write is a relocation from a source memory block (memory block ii) to the target memory block (memory block i). The source memory block (memory block ii) had its source relocation status clear, and its source modification status set. Accordingly, the write operation is of type 2. The target modification status for the target memory block is thus set (act 412) and the relocation status is clear (act 413). Thus, note that even though this was a relocation operation, the target relocation status does not identify this as having been a relocation, but simply indicates it to be a modification.

A similar analysis might be applied to the relocation of the value K from memory block x to memory block v in state 03. Once again, this write operation is of type 2. Thus, the target modification status of memory block v is set, and the target relocation status of memory block x is clear.

In state 03, value B has moved from memory block v to memory block ii. When writing to memory block ii, a write operation is detected thereby initiating the method 400A of FIG. 4A. In this case, the write is a relocation from a source memory block (memory block v) to the target memory block (memory block ii). The source memory block (memory block v) had its source relocation status clear, and its source modification status clear. Accordingly, the write operation is of type 3. The target modification status for the target memory block is thus clear (act 422) and the relocation status is set (act 423) (note the asterisk "*" in the upper right corner of memory block ii of state 03). Thus, the target memory block is identified as containing data that has been previously relocated. Furthermore, the target memory block (memory block ii) is identified as containing data coming from the source memory block (memory block v). This might be accomplished by the target memory block containing a pointer to the source memory block. In state 03 of FIG. 6, this is represented by memory block ii pointing to memory block v.

A similar analysis might be applied to the relocation of the value C from memory block vi to memory block iii in state 03. Once again, this write operation is of type 3. Thus, the target modification status of memory block iii is clear, and the target relocation status of memory block iii is set with a pointer to memory block vi. Write operations to memory blocks iv, vi, vii, and viii in state 03 are also of type 3. Thus, when value D is relocated from source memory block viii to target memory block iv, the modification status of memory block iv is clear, and the relocation status of memory block iv is set to point to source memory block viii. Furthermore, when value E is relocated from source memory block xi to target memory block vi, the modification status of target memory block vi is clear, and the relocation status of target memory block vi is set to point to source memory block xi. Also, when value F is relocated from source memory block xii to target memory block vii, the modification status of target memory block vii is clear, and the relocation status of target memory block vii is set to point to source memory block xii. Next, when value G is relocated from source memory block xiii to target memory block viii, the modification status of target memory block viii is clear, and the relocation status of target memory block viii is set and pointing to source memory block xiii. Finally, when value I is relocated from source memory block xv to target memory block ix, the modification status of target memory block ix is clear, and the relocation status of target memory block ix is set and pointing to source memory block xv. The data is moved from a source memory block, if there is no further data written to that source memory block, that memory block becomes unused. Accordingly, memory locations x through xiii and xv of state 03 are unused. Memory location xiv contains value H, which was not moved during the defragmentation operation. Occasionally, portions of memory are not relocatable during a defragmentation operation. Memory location xiv might be an example of this.

In transition from state 03 to state 04, a number of write operations and other deallocations occur.

Value L is written to memory block i. This is not a relocation write and is thus of type 1. The modification status of memory block i is thus set, and the relocation status clear. Similarly, values M, N and O are written to memory blocks vii, x and xiii, respectively. Accordingly, modification status of memory blocks vii, x and xiii are all set, and their relocation status clear. Additionally, memory blocks ii, iii, viii and ix become deallocated, thus joining memory blocks xi, xii, and xv as being unused.

In transitioning from state 04 to state 05, another defragmentation occurs. Thus, value D is moved from memory block iv to memory block ii. Now we encounter a write operation to memory block ii of type 4. Specifically, this is a relocation write in which the relocation status of the source memory block (memory block iv) is set. Thus, the modification status of memory block ii is clear (act 432), and the relocation status of memory block ii is set (act 433). However, instead of the relocation status of memory block ii pointing to the source memory block of the most immediate relocation (memory block iv), the pointer for the source memory block is copied to the target memory block (act 434). Thus, in this case, the relocation pointer for memory block ii inherits the relocation pointer for memory block iv. Thus, since memory block iv previously pointed to a prior source memory block viii, the memory block ii now points to memory block viii.

Something similar occurs for memory block iv. Specifically, value E is moved from memory block vi to memory block iv. This is also a write operation of type 4 since the source memory block vi had its relocation status set in state 03. Accordingly, the modification status of memory block iv is clear, but its relocation status is set. Furthermore, the memory block iv inherits the relocation pointer from memory block vi. Accordingly, in state 04, memory block iv has a relocation pointer to memory block xi.

The writes of values K, M, N and O to memory locations iii, v, vi and vii are all relocation writes in which the source modification status is set. These write operations are all thus of type 2. Accordingly, the memory locations iii, v, vi and vii all have their relocation status clear and their modification status set in state 05.

According to this method, the computing system tracks which memory blocks are to have their data included in the next incremental backup. However, instead of sending the new memory block values for every memory block whose value changed since the last backup, at least some of the values that are mere relocations are not sent. This can save significant space in an incremental backup.

Figure 7A:
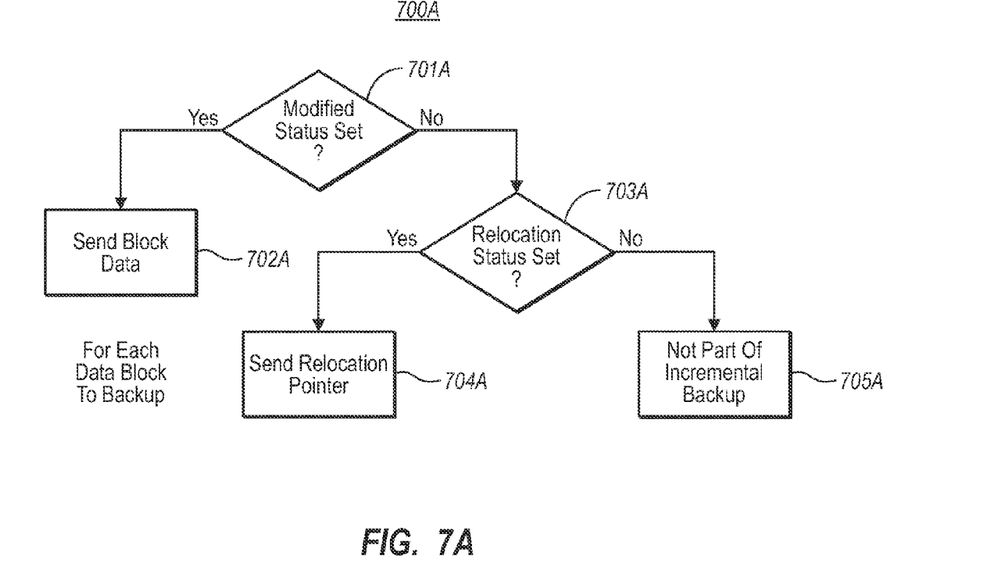
FIG. 7A illustrates a flowchart of a method for formulating an incremental backup in accordance with one embodiment when modification and relocation tracking is performed consistent with the method of FIG. 4A.
Figure 7B:
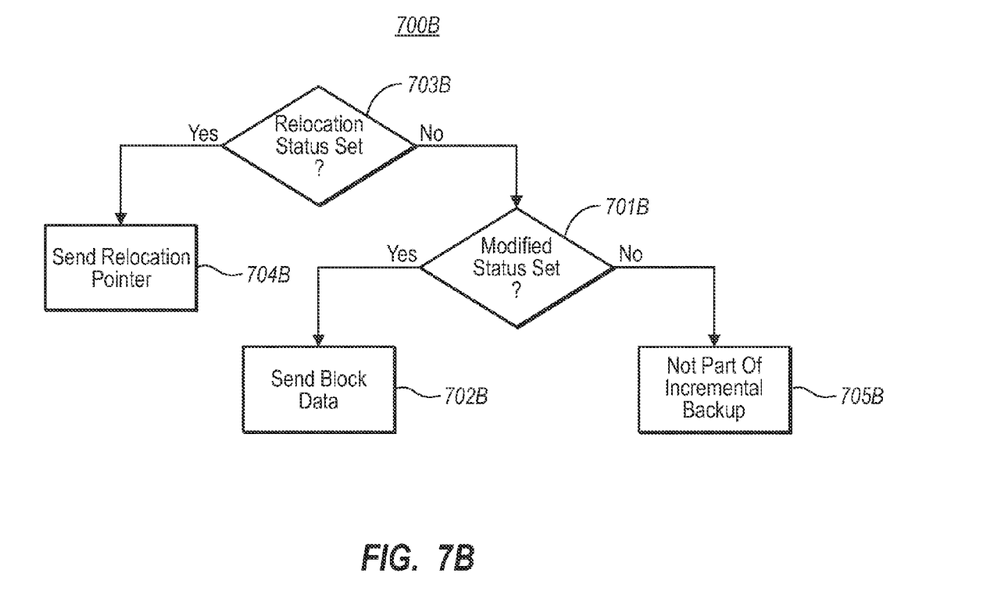
FIG. 7B illustrates a flowchart of a method for formulating an incremental backup in accordance with another embodiment when modification and relocation tracking is performed consistent with the method of FIG. 4A.
Figure 7C:
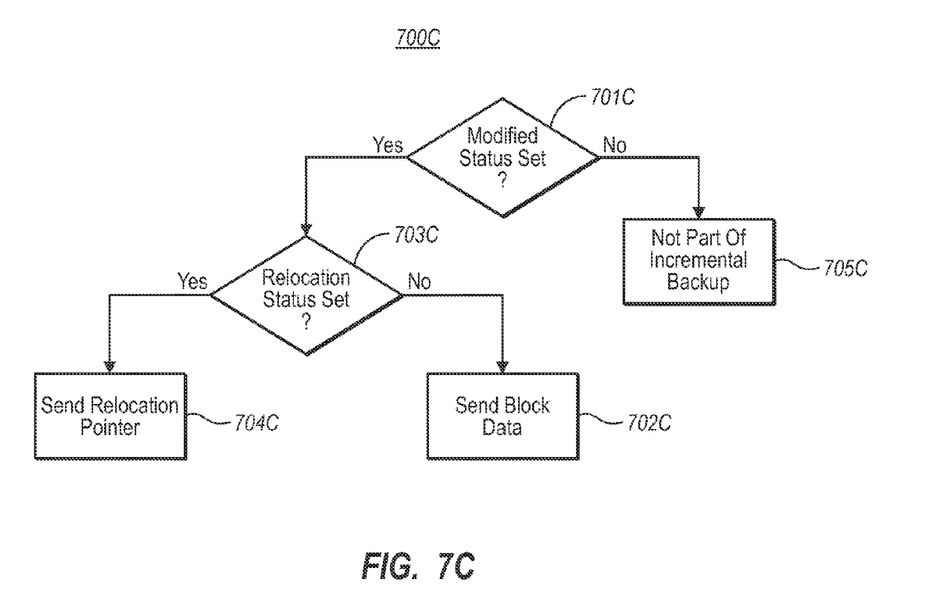
FIG. 7C illustrates a flowchart of a method for formulating an incremental backup in accordance with one embodiment when modification and relocation tracking is performed consistent with the method of FIG. 4B.
Figure 7D:
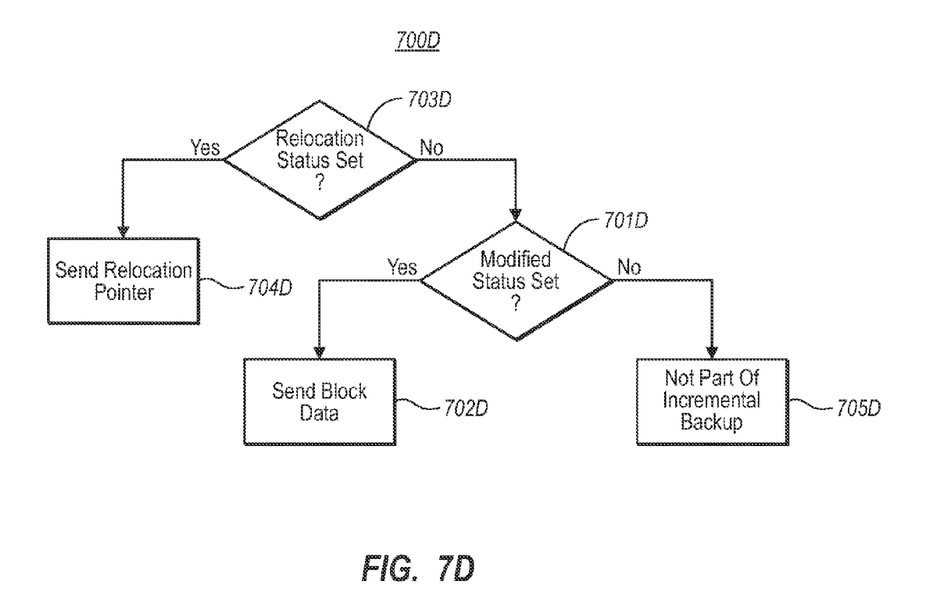
FIG. 7D illustrates a flowchart of a method for formulating an incremental backup in accordance with another embodiment when modification and relocation tracking is performed consistent with the method of FIG. 4B.

FIG. 7A illustrates a flowchart of a method 700A for formulating an incremental backup using the relocation and modification tracking information. For each memory block that has its modification status set (Yes in decision block 701A), the memory block data is included in the incremental backup (act 702A). For each memory block that has relocation status set (Yes in decision block 703A), the relocation pointer for that memory block is sent (act 704A). Otherwise, if the modification status is clear, and the relocation status is clear, the memory block is not included as part of the incremental backup (act 705A). FIG. 7B illustrates an alternative flowchart of a method 700B that performs the same function as method 700A. Specifically, for each memory block that has its relocation status set (Yes in decision block 703B), the relocation pointer for that memory block is sent (act 704B). For each memory block that has its modified status set (Yes in decision block 701B), the memory block data is included in the incremental backup (act 702B). Otherwise, if the modification status is clear, and the relocation status is clear, the memory block is not included as part of the incremental backup (act 705B).

Figure 4B:
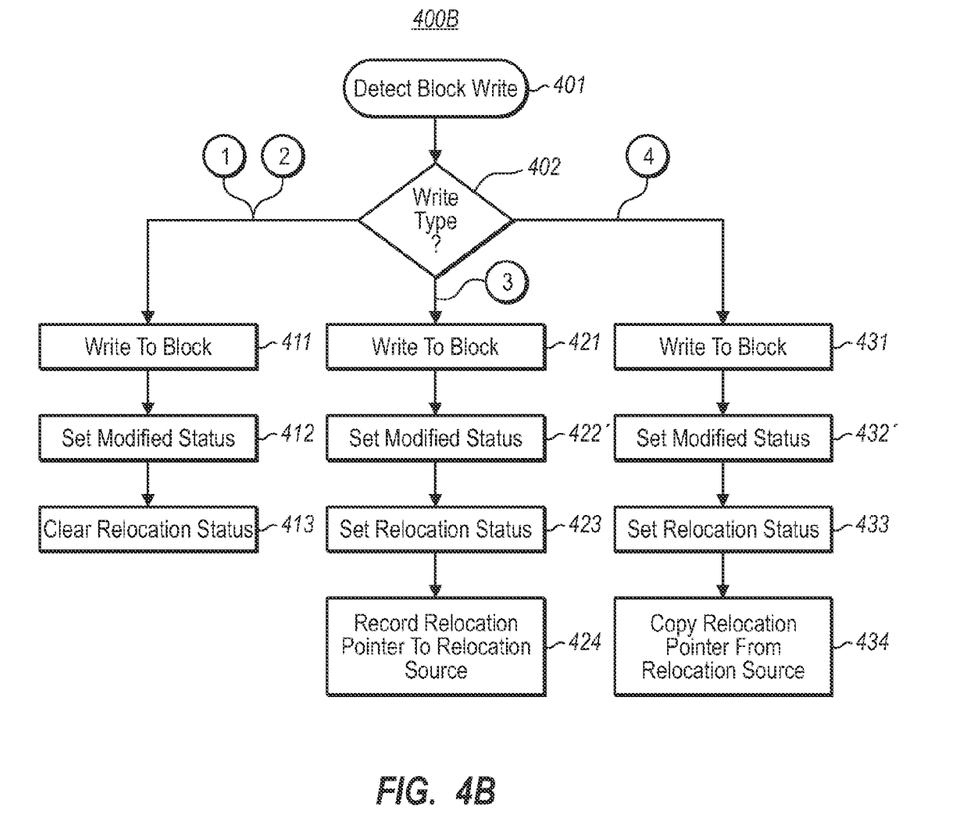
FIG. 4B illustrates a flowchart of a method for tracking modification and relocation in accordance with another embodiment of the present invention.

FIG. 4B illustrates an alternative method 400B for tracking modification and relocation information. The method 400B of FIG. 4B is similar to the method 400A of FIG. 4A, except that in the case of a relocation, the modified status is always set. Thus, in addition to the case 2, cases 3 and 4 will also result in the modified status being set. Accordingly, act 422 is replaced by act 422' in which the modified status is set. Similarly, act 432 is replaced by act 432' in which the modified status is set. In this situation, the analysis of FIG. 6 will be slightly different, but applying the method 700C or 700D of FIGS. 7C and 7D, the same incremental backup will result.

Specifically, application of method 400B to FIG. 6 will result in the same state 05 as the application of method 400A to FIG. 6, except that memory blocks ii and iv will have their modified status set. When an incremental back is to be performed, the method 700C of FIG. 7C, or the method 700D of FIG. 7D may be performed. Methods 700C and 700D result in the same function since the application of method 400B results in only one of three possible states. Either the memory block 1) has both its modification status and relocation status clear (in the case of memory block xiv), 2) has only its modification status set (in the case of memory blocks i, iii, v, vi, vii), or 3) has both its modification and relocations status set (in the case of memory blocks ii and iv). Accordingly, if the modification status is clear (No in decision blocks 701C and 701D), then the block is not part of the incremental backup (acts 705C and 705D). If the modification status is set (Yes in decision blocks 701C and 701D) and the relocation status is clear (No in decision blocks 703C and 703D), then the block data is sent (acts 702C and 702D). Otherwise, if the modification status is set (Yes in decision blocks 701C and 701D) and the relocation status is set (Yes in decision blocks 703C and 703D), then the relocation pointer is sent (acts 704C and 704D).

When the incremental backup is received at the backup computing system or by any other entity that formulates a new backup state using a prior backup and the incremental backup, the processing will be somewhat different depending on whether a new memory block data is received, or whether relocation data is received.

Figure 8:
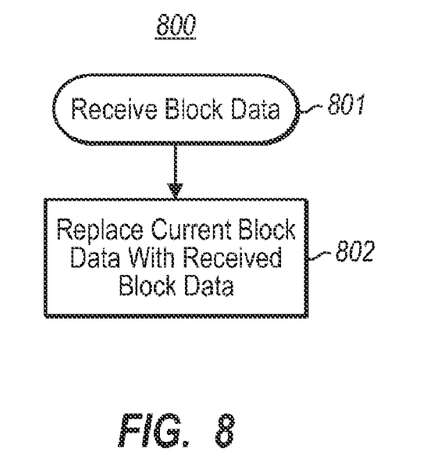
FIG. 8 illustrates a flowchart of a method for restoring active data from an incremental backup and a base backup when receiving modified block data.

FIG. 8 illustrates a flowchart of a method 800 for restoring a backup using an incremental backup and a prior backup when new memory block data is present for a particular memory block in the incremental backup. In that case, upon accessing or receiving the new memory block data (act 801), the new memory block data from the incremental backup is used to replace the prior data of the particular memory block (act 802).

Figure 9:
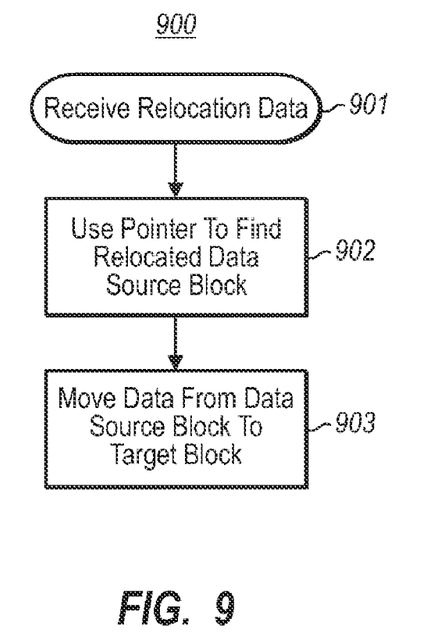
FIG. 9 illustrates a flowchart of a method for restoring active data from an incremental backup and a base backup when receiving relocation block data.

FIG. 9 illustrates a flowchart of a method 900 for restoring a backup using an incremental backup and a prior backup when relocation data is present for a particular memory block in the incremental backup. In that case, upon accessing or receiving the new relocation data (act 901), the relocation pointer is used to find the source memory block for the relocation in the prior backup (act 902). Then, the data from the source memory block in the prior backup is used to restore the data to the target memory block (act 903).

For instance, referring to the example of FIG. 6, suppose a backup was performed capturing state 01 of the memory blocks 600. Now suppose the incremental backup is taken to capture state 05 of the memory blocks 600. The incremental backup content and restoration process will now be described for each of the memory block locations i through xv in accordance with one example restoration process.

For memory block i, the incremental backup would include the content L of the memory block i at state 05. During restoration, the computing system would simply place the content L into the restored version of memory block i, instead of considering the memory block unused, as was the case in state 01.

For memory block ii, the incremental backup would indicate a relocation should be made from memory block viii. Accordingly, during restoration, the content of memory block viii of the prior backup (i.e., D) would be restored to memory block ii.

For memory block iii, the incremental backup would include the content K of the memory block iii at state 05. During restoration, the computing system would simply place the content K into the restored version of memory block iii, instead of considering the memory block unused, as was the case in state 01.

For memory block iv, the incremental backup would indicate a relocation should be made from memory block xi. Accordingly, during restoration, the content of memory block xi of the prior backup (i.e., E) would be restored to memory block iv.

For memory blocks v, vi, and vii, the incremental backup would include the content of the memory block v, vi, and vii, respectively, at state 05. During restoration, the computing system would simply place the content M, N and O into the restored version of memory blocks v, vi, and vii, respectively.

For memory blocks ix, x, and xiv, the situation has not changed. Thus there might be no information included for memory blocks ix, x, and xiv in the incremental backup. Thus, after backup, the backed up version of memory blocks ix, and xiv will remain unused. Furthermore, the prior backed up content (e.g., H) of memory block xiv remains unchanged and so is not included in the incremental backup.

For memory blocks xii, xiii, and xv, although not mentioned above, when these blocks were deallocated to arrive at state 03, the modification status may have become set. However, since the memory blocks were modified to become unused, new memory block data is not included in the incremental backup. Instead, some instruction to deallocate the memory blocks xii, xiii, and xv might be included. Thus, after back up, the backed up version of the memory blocks xii, xiii, and xv would indicate that these memory blocks are to be considered unused.

Accordingly, an efficient mechanism has been described for tracking, backing up and restoring for an incremental backup. The incremental backup may be made much smaller in situations in which many write operations are the result of not new data being written, but old data being moved around. Accordingly, incremental backups occurring after a defragmentation operation may be made much smaller than by using technologies that do not distinguish between a normal write operation representing new data, and a write operation that represents a relocation of old data. Relocation can also happen for other reasons besides a defragmentation operation, such as when a file is copied or moved from one location to another. If this relocation is detected, whether through technology that now exists or whether through technology to be developed, then that relocation information may be used to make incremental backups smaller using the principles described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for a computing system to track memory block relocation comprising:
    detecting a write operation to perform a write to a target memory block of the computing system;
    implementing the write operation on the target memory block;
    identifying the write operation to be due to a relocation of data from a source memory block to the target memory block;
    determining that the data from the source memory block had been previously relocated from another source memory block since the time that that data was last backed up;
    recording the target memory block as representing relocated data from the another source memory block;
    detecting a second write operation to perform a write to a second target memory block of the computing system;
    implementing the second write operation on the second target memory block;
    identifying the second write operation to be due to a relocation of data from a second source memory block to the second target memory block;
    determining that the data from the second source memory block has not been previously relocated from another source memory block since the time that that data was last backed up;
    determining that the data from the second source memory block has been previously modified since the time that the data from the second source memory block was last backed up; and
    recording that the data in the second target memory block is modified, but not relocated.

2. A method in accordance with claim 1, further comprising:
    detecting a third write operation to perform a write to a third target memory block of the computing system;

implementing the third write operation on the third target memory block;

identifying the third write operation to be due to a relocation of data from a third source memory block to the third target memory block;

determining that the data from the third source memory block has not been previously relocated from another source memory block since the time that that data was last backed up;

determining that the data from the third source memory block has not been previously modified since the time that the data from the third source memory block was last backed up; and recording that the data in the third target memory block is relocated from the third source memory block.

3. The method in accordance with claim 2, further comprising:

detecting a fourth write operation to perform a write to a fourth target memory block of the computing system;

implementing the fourth write operation on the fourth target memory block;

identifying the fourth write operation as not being due to a relocation of data from a source memory block to the fourth target memory block;

recording the fourth target memory block as representing modified data that does not represent relocated data.

4. A method in accordance with claim 1, further comprising:

detecting a third write operation to perform a write to a third target memory block of the computing system;

implementing the third write operation on the third target memory block;

identifying the third write operation as not being due to a relocation of data from a source memory block to the third target memory block; and recording the third target memory block as representing modified data that does not represent relocated data.

5. The method in accordance with claim 1, wherein the act of implementing the write operation on the target memory block, and the act of recording the target memory block as representing relocated data from the other prior source memory block are performed as part of a single transaction.

6. The method in accordance with claim 1, further comprising:

detecting a third write operation to perform a write to a third target memory block of the computing system;

implementing the third write operation on the third target memory block;

identifying the third write operation to be due to a relocation of data from a third source memory block to the third target memory block;

determining that the data from the third source memory block has been previously relocated from another source memory block since the time that that data was last backed up; and recording that the data in the third target memory block is relocated from the another source memory block.

7. The method in accordance with claim 1, wherein the target memory block is a cluster, and the source memory block and the target memory block are stored on a hard disk.

8. The method in accordance with claim 1, wherein the computing system is located on a single physical machine.

9. The method in accordance with claim 1, wherein the computing system is distributed across a network.

10. The method in accordance with claim 1, further comprising the following before the act of detecting the write operation:

performing a base backup of a plurality of memory blocks including the target memory block.

11. A method for a computing system to track memory block relocation comprising:

detecting a write operation to perform a write to a target memory block of the computing system;

implementing the write operation on the target memory block;

identifying the write operation to be due to a relocation of data from a source memory block to the target memory block;

determining that the data from the source memory block has not been previously relocated from another source memory block since the time that that data was last backed up;

determining whether or not the data from the source memory block had been previously modified since the time that the data from the source memory block was last backed up;

wherein if the act of determining whether or not the data from the source memory block had been previously modified determines that the data from the source memory block has been previously modified since the time that the data from the source memory block was last backed up, recording that the data in the target memory block is modified, but not relocated.

12. The method in accordance with claim 11, wherein the recited method is repeated for a plurality of memory blocks.

13. The method in accordance with claim 11, wherein if the act of determining whether or not the data from the source memory block had been previously modified determines that the data from the source memory block has not been previously modified since the time that the data from the source memory block was last backed up, the method further includes the following:

recording that the data in the target memory block is relocated from the source memory block.

14. The method in accordance with claim 11, further comprising:

detecting a second write operation to perform a write to a second target memory block of the computing system;

implementing the second write operation on the second target memory block;

identifying the second write operation to be due to a relocation of data from a second source memory block to the second target memory block;

determining that the data from the second source memory block has been previously relocated from another source memory block since the time that that data was last backed up; and recording that the data in the second target memory block is relocated from the another source memory block.

15. A computing system comprising:

one or more processors;

memory including a source memory block and a target memory block;

wherein the one or more processors execute computer-executable instructions to: detect a write operation to perform a write to the target memory block, identify the write operation to be due to a relocation of data from the source memory block to the target memory block, determine that the data from the source memory block had been previously relocated from another source memory block since the time that that data was last backed up, record the target memory block as representing relocated data from the another source memory block, detect a second write operation to perform a write to a second target memory block of the computing system, identify the second write operation to be due to a relocation of data from a second source memory block to the second target memory block, determine that the data from the second source memory block has not been previously relocated from another source memory block since the time that that data was last backed up, determine that the data from the second source memory block has been previously modified since the time that the data from the second source memory block was last backed up, and record that the data in the second target memory block is modified, but not relocated.

16. A computing system in accordance with claim 15, wherein memory includes a third source memory block and a third target memory block, wherein the one or more processors execute computer-executable instructions to: detect a third write operation to perform a write to the third target memory block of the computing system, identify the third write operation to be due to a relocation of data from the third source memory block to the third target memory block, determine that the data from the third source memory block has not been previously relocated from another source memory block since the time that that data was last backed up, determine that the data from the third source memory block has not been previously modified since the time that the data from the third source memory block was last backed up, and record that the data in the third target memory block is relocated from the third source memory block.

17. A computing system in accordance with claim 16, wherein the memory includes a fourth target memory block, and wherein the one or more processors execute computer-executable instructions to: detect a fourth write operation to perform a write to the fourth target memory block of the computing system, identify the fourth write operation as not being due to a relocation of data to the fourth target memory block, and record the fourth target memory block as representing modified data that does not represent relocated data.

18. A computing system in accordance with claim 15, wherein the memory includes a third target memory block, and wherein the one or more processors execute computer-executable instructions to: detect a third write operation to perform a write to the third target memory block of the computing system, identify the third write operation as not being due to a relocation of data to the third target memory block, and record the third target memory block as representing modified data that does not represent relocated data.

* * * * *